(12) United States Patent
Sakamoto et al.

(10) Patent No.: US 10,267,995 B2
(45) Date of Patent: Apr. 23, 2019

(54) SUBSTRATE-TYPE OPTICAL WAVEGUIDE AND SUBSTRATE-TYPE OPTICAL MODULATOR

(71) Applicant: FUJIKURA LTD., Tokyo (JP)

(72) Inventors: Shinichi Sakamoto, Sakura (JP); Kazuhiro Goi, Sakura (JP); Norihiro Ishikura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/689,121

(22) Filed: Aug. 29, 2017

(65) Prior Publication Data

US 2018/0059327 A1    Mar. 1, 2018

(30) Foreign Application Priority Data

Aug. 30, 2016  (JP) ................................. 2016-168269

(51) Int. Cl.
*G02F 1/35* (2006.01)
*G02B 6/293* (2006.01)
*G02B 6/10* (2006.01)
*G02B 6/125* (2006.01)
*G02B 6/126* (2006.01)
*G02F 1/035* (2006.01)

(52) U.S. Cl.
CPC .......... *G02B 6/29325* (2013.01); *G02B 6/10* (2013.01); *G02B 6/125* (2013.01); *G02B 6/126* (2013.01); *G02B 6/29394* (2013.01); *G02F 1/035* (2013.01)

(58) Field of Classification Search
CPC .. G02B 6/29325; G02B 6/29394; G02B 6/10; G02B 6/125; G02B 6/126; G02F 1/035
USPC ............................................................. 385/3
See application file for complete search history.

(56) References Cited

U.S. PATENT DOCUMENTS

| 8,149,493 B2 | 4/2012 | Chen |
| 9,423,667 B2 * | 8/2016 | Matsumoto ........... G02F 1/2255 |
| 9,523,871 B2 * | 12/2016 | Kitamura ................ G02F 1/218 |

(Continued)

FOREIGN PATENT DOCUMENTS

| JP | 2015-129906 A | 7/2015 |
| JP | 2015-148711 A | 8/2015 |

OTHER PUBLICATIONS

Wiley Encyclopedia of Electrical and Electronics Engineering. Copyright # 1999 John Wiley & Sons, Inc Switches Authors R. Tavlykaev and R. V. Ramaswamy Chapter Electro-Optic.*

(Continued)

*Primary Examiner* — Thomas A Hollweg
*Assistant Examiner* — Guy G Anderson
(74) *Attorney, Agent, or Firm* — Westerman, Hattori, Daniels & Adrian, LLP (57) ABSTRACT

In order to reduce a high frequency loss of a substrate-type optical waveguide without facilitating, in a low frequency domain, a reflection by an entrance end of a traveling-wave electrode, the substrate-type optical waveguide includes a coplanar line, provided on an upper surface of an upper cladding, which includes (i) a traveling-wave electrode connected to a P-type semiconductor region and (ii) an earth conductor connected to an N-type semiconductor region. The traveling-wave electrode and the earth conductor are provided so that a distance D therebetween decreases as a distance from an entrance end of the traveling-wave electrode increases.

6 Claims, 5 Drawing Sheets

(56) References Cited

U.S. PATENT DOCUMENTS

| | | | |
|---|---|---|---|
| 9,810,842 B2* | 11/2017 | Oka | G02B 6/126 |
| 9,817,294 B2* | 11/2017 | Goi | G02F 1/2257 |
| 2005/0013522 A1 | 1/2005 | Doi | |
| 2007/0280309 A1 | 12/2007 | Liu | |
| 2009/0263081 A1* | 10/2009 | Cox | H01Q 3/2676 |
| | | | 385/27 |
| 2009/0290830 A1 | 11/2009 | Mitomi et al. | |
| 2010/0158428 A1 | 6/2010 | Kawano et al. | |
| 2010/0232737 A1* | 9/2010 | Sugiyama | G02B 6/12007 |
| | | | 385/2 |
| 2011/0135241 A1 | 6/2011 | Shimizu et al. | |
| 2012/0033910 A1 | 2/2012 | Morini et al. | |
| 2012/0087614 A1 | 4/2012 | Ishimura et al. | |
| 2012/0294563 A1 | 11/2012 | Thomson et al. | |
| 2014/0233878 A1* | 8/2014 | Goi | G02F 1/2257 |
| | | | 385/3 |
| 2015/0003782 A1* | 1/2015 | Oka | G02B 6/2804 |
| | | | 385/42 |
| 2015/0293427 A1* | 10/2015 | Goi | G02F 1/025 |
| | | | 385/3 |
| 2015/0378238 A1* | 12/2015 | Matsumoto | G02F 1/2255 |
| | | | 385/2 |
| 2016/0011439 A1* | 1/2016 | Kitamura | G02F 1/218 |
| | | | 385/2 |
| 2016/0054639 A1* | 2/2016 | Kono | G02F 1/2255 |
| | | | 385/2 |

OTHER PUBLICATIONS

Notice of Allowance dated Oct. 6, 2017, issued in U.S. Appl. No. 15/658,871 (12 pages).

* cited by examiner

SUBSTRATE-TYPE OPTICAL WAVEGUIDE AND SUBSTRATE-TYPE OPTICAL MODULATOR

This Nonprovisional application claims priority under 35 U.S.C. § 119 on Patent Application No. 2016-168269 filed in Japan on Aug. 30, 2016, the entire contents of which are hereby incorporated by reference.

TECHNICAL FIELD

The present invention relates to a substrate-type optical waveguide having a phase modulation function. Moreover, the present invention relates to a substrate-type optical modulator which includes the substrate-type optical waveguide as a phase modulating section.

BACKGROUND ART

In the field of optical communications, there has been practically used a technique of realizing an optical modulator by employing a substrate-type optical waveguide. For example, a substrate-type optical waveguide having a phase modulation function can be realized by forming, in a core of the substrate-type optical waveguide, a P-type semiconductor region and an N-type semiconductor region. In such a substrate-type optical waveguide, an effective refractive index of the core changes in accordance with a signal voltage applied across the P-type semiconductor region and the N-type semiconductor region. To apply a signal voltage, for example, a coplanar line is used which is provided on a surface of the substrate-type optical waveguide.

For example, Patent Literatures 1 through 3 each disclose a substrate-type optical waveguide having a phase modulation function.

CITATION LIST

Patent Literature

[Patent Literature 1]
 Japanese Patent Application Publication Tokukai No. 2015-129906 (Publication date: Jul. 16, 2015)
[Patent Literature 2]
 Japanese Patent Application Publication Tokukai No. 2015-148711 (Publication date: Aug. 20, 2015)
[Patent Literature 3]
 Specification of U.S. Pat. No. 8,149,493 (Registration date: Apr. 3, 2012)

SUMMARY OF INVENTION

Technical Problem

In a substrate-type optical waveguide having a phase modulation function, there is a high frequency loss which can be approximated by a formula (1) below, where R, C, and L represent a resistance, a capacitance, and an inductance of the substrate-type optical waveguide, respectively. For the reasons discussed below, conventional substrate-type optical waveguides are difficult to reduce the high frequency loss.

[Math. 1]

$$\alpha \approx \frac{1}{2}\omega\sqrt{LC}\left(\frac{R}{\omega L} + \omega RC\right) \quad (1)$$

As is clear from the formula (1), in a frequency domain in which $R/\omega L \ll \omega RC$, the high frequency loss is proportional to the 3/2 power of a capacitance C and is proportional to the ½ power of an inductance L. It follows that, in order to reduce the high frequency loss in such a frequency domain, it is considered to reduce the capacitance C or the inductance L.

The capacitance C of the substrate-type optical waveguide can be reduced by reducing (i) carrier densities of respective of a P-type semiconductor region and an N-type semiconductor region or (ii) a waveguide length. Such a configuration, however, makes it necessary to increase a signal voltage Vpi, which is to be applied across the P-type semiconductor region and the N-type semiconductor region so that an effective refractive index of a core is controlled to have a certain value. This causes a problem that the substrate-type optical waveguide consumes more electric power. It is therefore difficult to employ a configuration in which the capacitance C is reduced for the purpose of reducing the high frequency loss. In contrast, the inductance L of the substrate-type optical waveguide can be reduced by reducing, for example, a distance between a traveling-wave electrode and an earth conductor, which constitute a coplanar line.

A characteristic impedance of the substrate-type optical waveguide changes in accordance with (i) the capacitance C of the substrate-type optical waveguide and (ii) the distance between the traveling-wave electrode and the earth conductor (particularly, a distance, at an entrance end surface, between the traveling-wave electrode and the earth conductor). However, the characteristic impedance of the substrate-type optical waveguide does not match an impedance of a circuit followed by the substrate-type optical waveguide, in a case where the distance between the traveling-wave electrode and the earth conductor is reduced for the purpose of reducing the inductance L of the substrate-type optical waveguide. This facilitates a reflection by an entrance end of the traveling-wave electrode. Such a reflection can adversely affect a driver circuit, which is a supply source of a signal voltage.

The present invention has been attained in view of the above problem, and an objective of the present invention is to reduce, in a substrate-type optical waveguide having a phase modulation function, particularly in a substrate-type optical waveguide in which a coplanar line is employed to apply a signal voltage, a high frequency loss while restraining a reflection by an entrance end of a traveling-wave electrode.

Solution to Problem

A substrate-type optical waveguide in accordance with an aspect of the present invention includes: a lower cladding; a core, provided on an upper surface of the lower cladding, which has a P-type semiconductor region and an N-type semiconductor region; an upper cladding which is laminated on the lower cladding so that the core is buried in the upper cladding; and a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region, the traveling-wave electrode and the earth conductor being provided so that a distance therebetween decreases as a distance from an entrance end of the traveling-wave electrode increases.

The configuration makes it possible to reduce a distance, at each cross section other than an entrance end surface, between the traveling-wave electrode and the earth conductor while maintaining a distance, at the entrance end surface, between the traveling-wave electrode and the earth conductor. It is therefore possible to reduce an inductance of the substrate-type optical waveguide while maintaining a characteristic impedance of the substrate-type optical waveguide. Consequently, it is possible to reduce a high frequency loss while restraining the reflection by the entrance end of the traveling-wave electrode.

Advantageous Effects of Invention

An aspect of the present invention makes it possible to reduce a high frequency loss while restraining a reflection by an entrance end of a traveling-wave electrode.

BRIEF DESCRIPTION OF DRAWINGS (a) of FIG. 1 is a plan view of a substrate-type optical waveguide in accordance with an embodiment of the present invention. (b) of FIG. 1 is a cross-sectional view of the substrate-type optical waveguide taken along a line A-A' near an entrance end surface. (c) of FIG. 1 is a cross-sectional view of the substrate-type optical waveguide taken along a line B-B' near an exit end surface.

(a) of FIG. 2 is a substrate-type optical waveguide, illustrated in FIG. 1, which employs a configuration in which a traveling-wave electrode and an earth conductor are provided so that a distance D therebetween decreases in stages, particularly in a two-stage manner, as a distance from an entrance end surface increases. (b) of FIG. 2 is a substrate-type optical waveguide, illustrated in FIG. 1, which employs a configuration in which the traveling-wave electrode and the earth conductor are provided so that the distance D therebetween decreases in stages, particularly in a four-stage manner, as a distance from the entrance end surface increases.

(a) of FIG. 3 is a graph showing frequency dependencies of reflection coefficients S11 of respective of the substrate-type optical waveguides illustrated in (a) and (b) of FIG. 2 and an optical waveguide in accordance with a comparative example. (b) of FIG. 3 is a graph showing frequency dependencies of transmission coefficients S21 of respective of the substrate-type optical waveguides illustrated in (a) and (b) of FIG. 2 and the optical waveguide in accordance with the comparative example.

(a) of FIG. 4 is a plan view of Variation 1 of the substrate-type optical waveguide illustrated in FIG. 1. (b) of FIG. 4 is a plan view of Variation 2 of the substrate-type optical waveguide illustrated in FIG. 1.

DESCRIPTION OF EMBODIMENTS

[Configuration of Substrate-Type Optical Waveguide]

Figure 1:
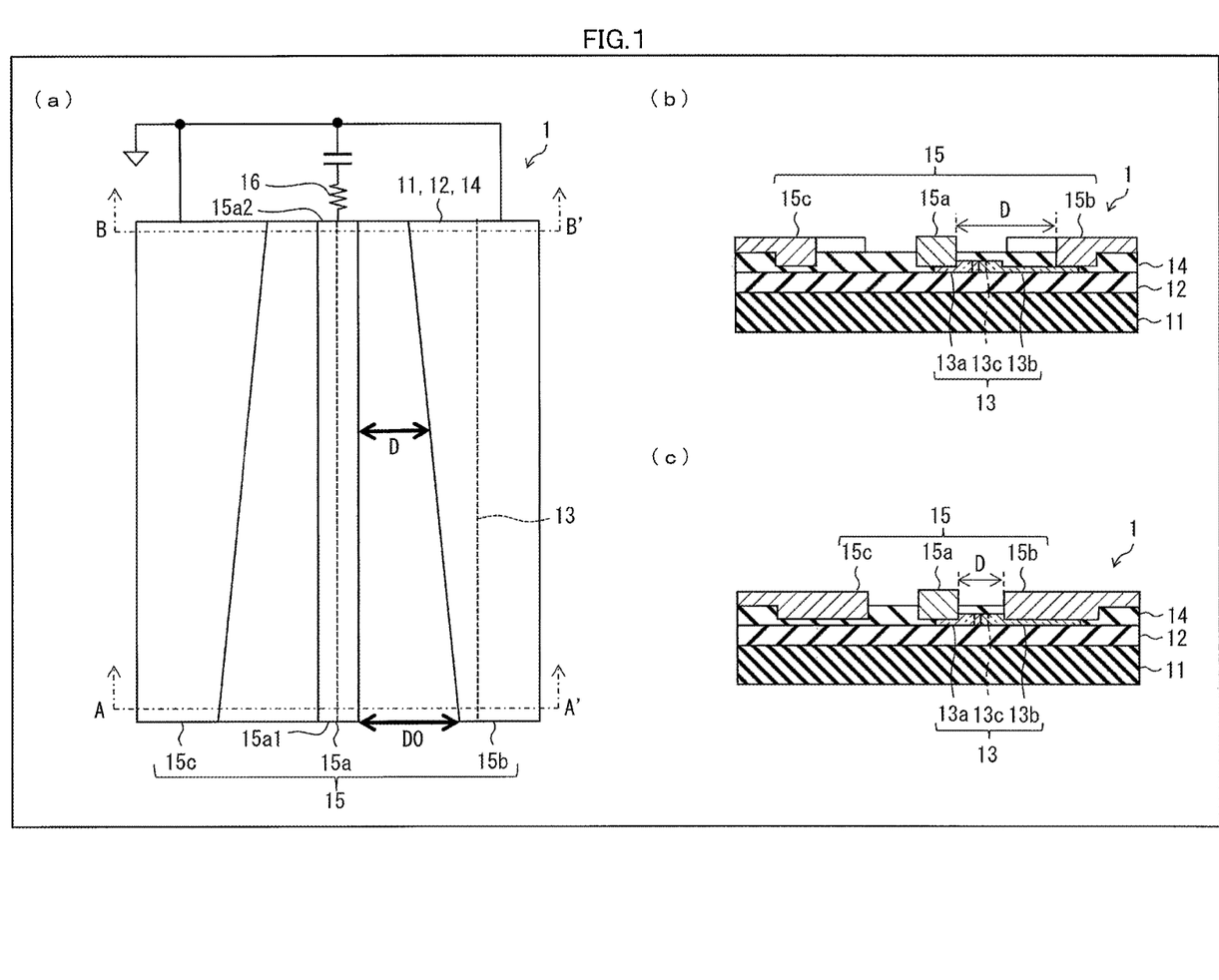

The following description will discuss, with reference to FIG. 1, a configuration of a substrate-type optical waveguide 1 in accordance with an embodiment of the present invention. (a) of FIG. 1 is a plan view of the substrate-type optical waveguide 1. (b) of FIG. 1 is a cross-sectional view of the substrate-type optical waveguide 1 taken along a line A-A' near an entrance end surface 1A. (c) of FIG. 1 is a cross-sectional view of the substrate-type optical waveguide 1 taken along a line B-B' near an exit end surface 1B. The substrate-type optical waveguide 1 illustrated in FIG. 1 is a substrate-type optical waveguide having a phase modulation function, and can also be regarded as a part of a substrate-type optical modulator.

The substrate-type optical waveguide 1 includes (i) a silicon substrate 11, (ii) a lower cladding 12 which is laminated on the silicon substrate 11, (iii) a core 13 which is provided on an upper surface of the lower cladding 12, (iv) an upper cladding 14 which is laminated on the lower cladding 12 so that the core 13 is buried in the upper cladding 14, and (v) a coplanar line 15 which is provided on an upper surface of the upper cladding 14 (see (b) and (c) of FIG. 1). The coplanar line 15 includes (i) a traveling-wave electrode 15a and (ii) a pair of earth conductors 15b and 15c between which the traveling-wave electrode 15a is sandwiched.

In order for the core 13 to serve as an optical waveguide, the lower cladding 12 and the upper cladding 14 are each made of a medium which has a refractive index lower than that of a medium of which the core 13 is made. In the present embodiment, the core 13 is made of silicon, and the lower cladding 12 and the upper cladding 14 are each made of silica which has a refractive index lower than that of silicon. With the configuration, in a case where light enters the core 13 via the entrance end surface 1A, it propagates from the entrance end surface 1A toward the exit end surface 1B while being confined within the core 13, and then exits the core 13 via the exit end surface 1B. The core 13 thus serves as an optical waveguide.

In the core 13, a P-type semiconductor region 13a and an N-type semiconductor region 13b are each provided across an entire section extending from the entrance end surface 1A to the exit end surface 1B so that the core 13, which serves as an optical waveguide, also serves as a phase modulator. The P-type semiconductor region 13a, which serves as a P-type semiconductor, is doped with a triad such as boron. The N-type semiconductor region 13b, which serves as an N-type semiconductor, is doped with a pentad such as phosphorous. One of the P-type semiconductor region 13a and the N-type semiconductor region 13b (in the present embodiment, the P-type semiconductor region 13a) is connected to the traveling-wave electrode 15a across the entire section extending from the entrance end surface 1A to the exit end surface 1B. The other (in the present embodiment, the N-type semiconductor region 13b) is connected to the earth conductor 15b across the entire section extending from the entrance end surface 1A to the exit end surface 1B. With the configuration, in a case where a signal voltage is applied across the traveling-wave electrode 15a, i.e., between an entrance end (i.e., an end on an entrance end surface 1A side) and an exit end of the traveling-wave electrode 15a, there is formed a depletion layer 13c having a width, which changes in accordance with the signal voltage, in the vicinity of a boundary between the P-type semiconductor region 13a and the N-type semiconductor region 13b. This causes an effective refractive index of the core 13 to change in accordance with the signal voltage. As such, in a case where signal light enters the core 13 via the entrance end surface 1A, the signal light is subjected to phase modulation while propagating through the core 13. The core 13 thus also serves as a phase modulator.

Note that in the present embodiment, (i) the core 13a is of a rib-slab type and (ii) a boundary surface between the P-type semiconductor region 13a and the N-type semiconductor region 13b is located within a rib of the core 13. The core of "rib-slab type" herein refers to a core which has a cross section of an inverted T-shape in a direction orthogonal to a direction in which light propagates through the core. The core of rib-slab type allows light, which propagates through the core, to be unevenly distributed in a center part (also referred to as a "rib") which is higher than both end parts (also referred as "slabs"). Furthermore, the boundary surface between the P-type semiconductor region 13a and the N-type semiconductor region 13b is located within the rib of the core 13. This causes a region, in which light propagating through the core 13 is unevenly distributed, to overlap with a region in which the depletion layer 13c is formed. This makes it possible to more effectively carry out phase modulation with respect to light propagating through the core 13.

A first feature of the substrate-type optical waveguide 1 in accordance with the present embodiment resides in that the traveling-wave electrode 15a and the earth conductor 15b are provided so that a distance D therebetween decreases as a distance from an entrance end 15a1 of the traveling-wave electrode 15a increases (see (a) of FIG. 1). This makes it possible to reduce an inductance L of the substrate-type optical waveguide 1 while maintaining a distance D0, at the entrance end 15a1, between the traveling-wave electrode 15a and the earth conductor 15b. It is therefore possible to reduce a high frequency loss without facilitating a reflection by the entrance end 15a1 of the traveling-wave electrode 15a.

The following description will discuss why the reflection is not facilitated by the entrance end 15a1 of the traveling-wave electrode 15a. A dominant parameter on which a characteristic impedance Z of the substrate-type optical waveguide 1 depends is the distance D0, at the entrance end 15a1, between the traveling-wave electrode 15a and the earth conductor 15b. In view of the fact, the distance D0, at the entrance end 15a1, between the traveling-wave electrode 15a and the earth conductor 15b is set so that the characteristic impedance Z of the substrate-type optical waveguide 1 matches an impedance (e.g., 50Ω) of a circuit followed by the substrate-type optical waveguide 1. The matching between (i) the characteristic impedance Z of the substrate-type optical waveguide 1 and (ii) the impedance of the circuit followed by the substrate-type optical waveguide 1 will not be impaired, even in a case where a configuration is employed in which the traveling-wave electrode 15a and the earth conductor 15b are provided so that the distance D therebetween decreases as a distance from the entrance end 15a1 increases. This consequently prevents the reflection, by the entrance end 15a1 of the traveling-wave electrode 15a, from being facilitated.

The following description will discuss why the high frequency loss is reduced in a high frequency domain. In a frequency domain in which R/ωL<<ωRC, the high frequency loss, which can be approximated by the formula (1) above, is proportional to the ½ power of the inductance L. It is therefore possible to reduce the inductance L of the coplanar line 15, by employing a configuration, in which the traveling-wave electrode 15a and the earth conductor 15b are provided so that the distance D therebetween decreases as a distance from the entrance end 15a1 increases, so that the high frequency loss is reduced.

Note that the distance D between the traveling-wave electrode 15a and the earth conductor 15b can continuously decrease as a distance from the entrance end 15a1 increases (first configuration). Alternatively, the distance D can decrease in stages as a distance from the entrance end 15a1 increases (second configuration). (a) of FIG. 1 illustrates a substrate-type optical waveguide 1 which employs the first configuration.

A second feature of the substrate-type optical waveguide 1 in accordance with the present embodiment resides in that a terminal resistor 16 is connected to an exit end (i.e., an end on an exit end surface 1B side) of the traveling-wave electrode 15a (see (a) of FIG. 1). As with the characteristic impedance Z of the substrate-type optical waveguide 1, a resistance RO of the terminal resistor 16 is set so as to match an impedance (e.g., 50Ω) of a circuit which is followed by the substrate-type optical waveguide 1.

In a low frequency domain (i.e., a frequency domain in which a wavelength is longer than a waveguide length of the substrate-type optical waveguide 1), an electromagnetic wave is propagated in the traveling-wave electrode 15a as if a local characteristic impedance of the substrate-type optical waveguide 1 was not substantially changed. The local characteristic impedance depends on the distance D. It follows that no significant impedance gap occurs between (i) an exit end 15a2 of the traveling-wave electrode 15a and (ii) the terminal resistor 16, provided that the distance D0, at the entrance end 15a1, between the traveling-wave electrode 15a and the earth conductor 15b is set so that the characteristic impedance Z of the substrate-type optical waveguide 1 matches the impedance (e.g., 50Ω) of the circuit followed by the substrate-type optical waveguide 1. Therefore, in the low frequency domain, it is possible to (i) restrain a reflection by the entrance end 15a1 of the traveling-wave electrode 15a and (ii) restrain a reflection by the exit end 15a2 of the traveling-wave electrode 15a.

In contrast, in a high frequency domain (i.e., a frequency domain in which the wavelength is shorter than the waveguide length of the substrate-type optical waveguide 1), an electromagnetic wave is propagated in the traveling-wave electrode 15a while being affected by a change in local characteristic impedance of the substrate-type optical waveguide 1. The local characteristic impedance depends on the distance D. It follows that a significant impedance gap can occur between (i) the exit end 15a2 of the traveling-wave electrode 15a and (ii) the terminal resistor 16, even in a case where the distance D0, at the entrance end 15a1, between the traveling-wave electrode 15a and the earth conductor 15b is set so that the characteristic impedance Z of the substrate-type optical waveguide 1 matches the impedance (e.g., 50Ω) of the circuit followed by the substrate-type optical waveguide 1. Therefore, in the high frequency domain, it is only possible to restrain a reflection by the entrance end 15a1 of the traveling-wave electrode 15a but it is not possible to restrain a reflection by the exit end 15a2 of the traveling-wave electrode 15a. Note, however, that a wave reflected by the exit end 15a2 of the traveling-wave electrode 15a adversely affects a driver circuit (i.e., a signal source of a signal voltage) in the low frequency domain in which a waveguide loss is small, not in the high frequency domain in which the waveguide loss is large. This is because, in the high frequency domain, a wave, reflected by the exit end 15a2 of the traveling-wave electrode 15a, is subjected to a sufficient attenuation (which is greater than an attenuation to which the wave is subjected in the low frequency domain) while propagating through the coplanar line 15 in an opposite direction.

Note that (a) of FIG. 1 illustrates an example configuration in which one terminal of the terminal resistor 16 is connected to the traveling electrode 15a, and the other terminal is connected, via a capacitor, to the earth conductor 15b and a ground. The present embodiment is, however, not limited as such. Alternatively, the present embodiment can be configured such that one terminal of the terminal resistor 16 is connected to the traveling-wave electrode 15a, and the other terminal of the terminal resistor 16 is merely connected to the earth conductor 15b via a capacitor. Alternatively, the present embodiment can be configured such that one terminal of the terminal resistor 16 is connected to the traveling-wave electrode 15a, and the other terminal of the terminal resistor 16 is merely connected to a ground via a capacitor.

[Effect Brought about by Substrate-Type Optical Waveguide]

Figure 2:
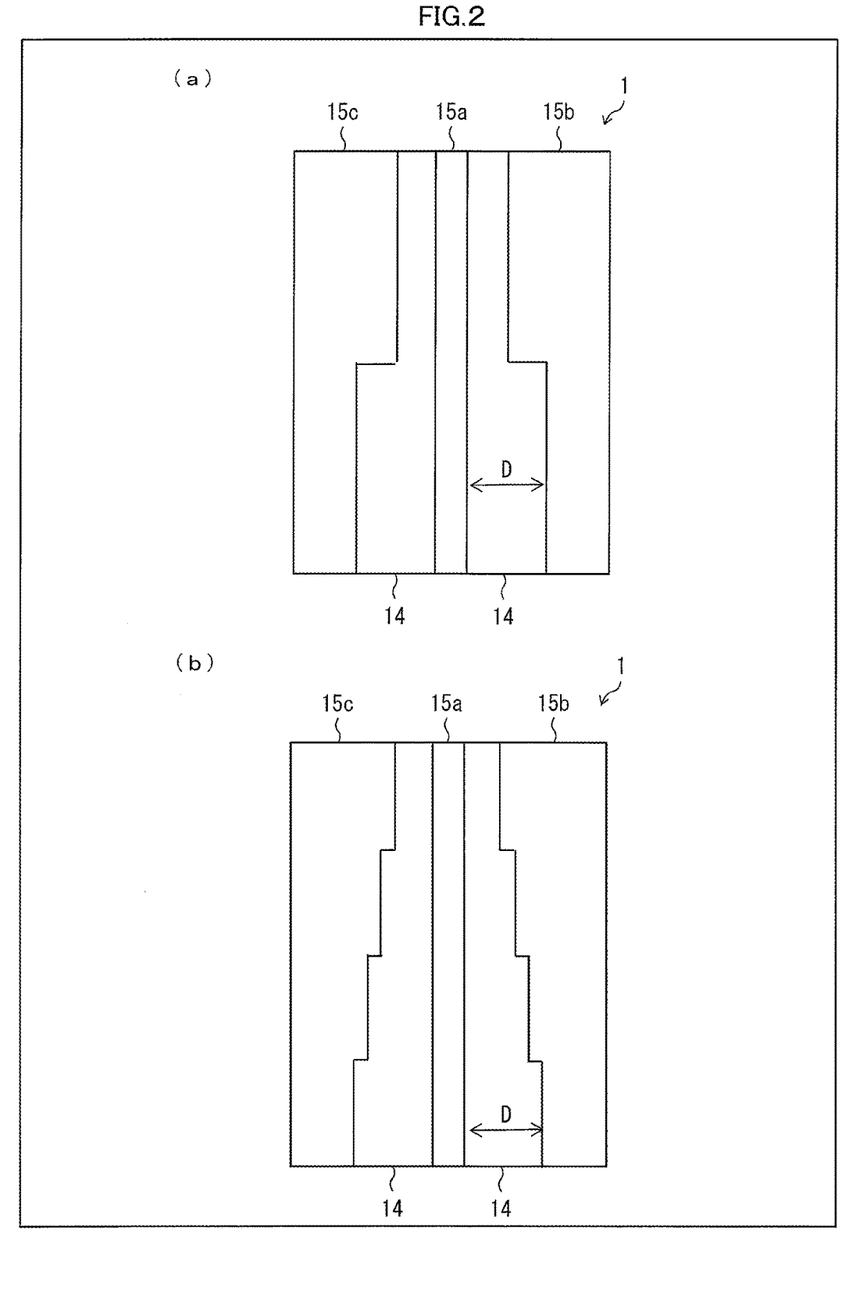
Figure 3:
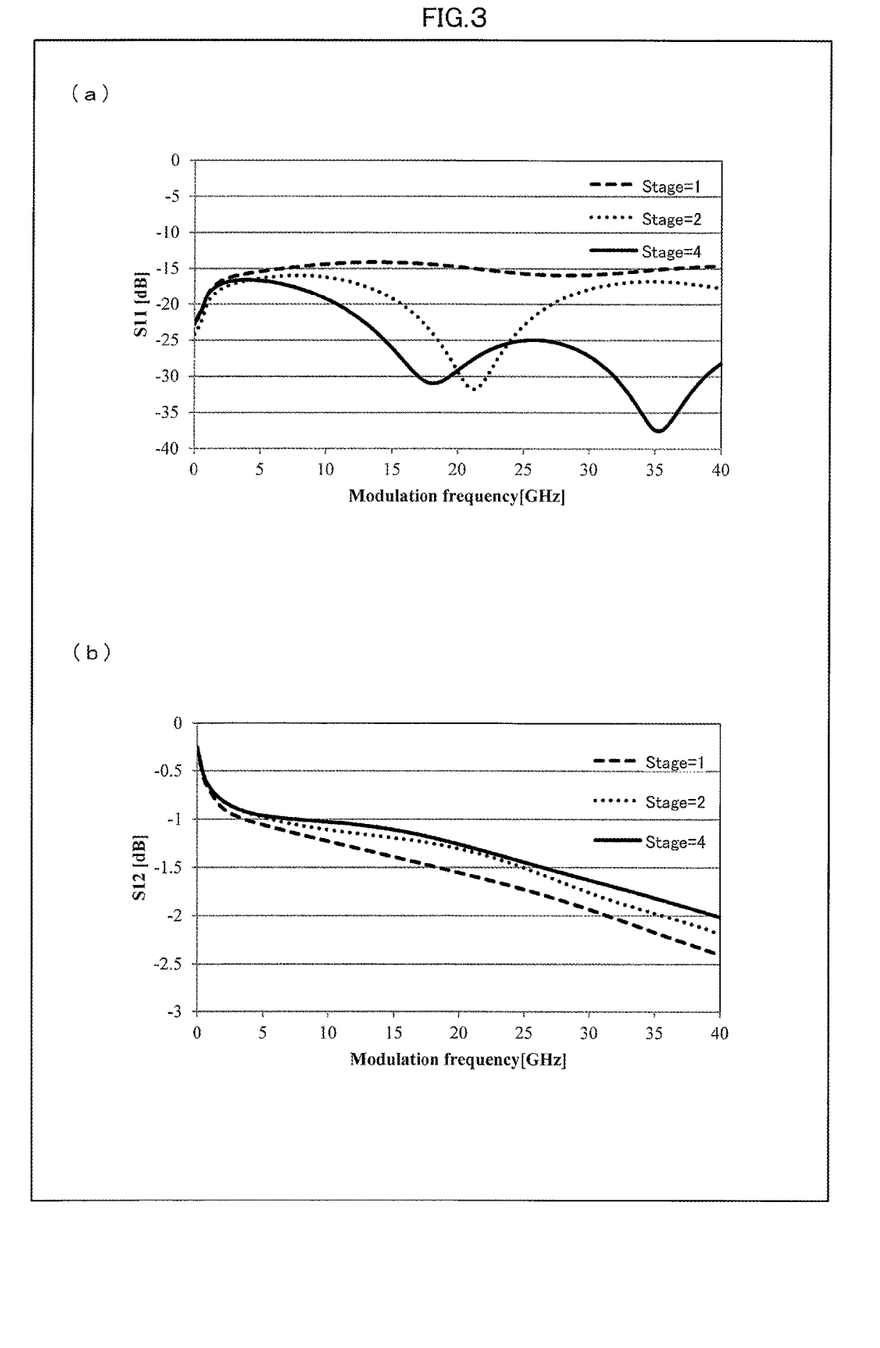

The following description will discuss, with reference to FIGS. 2 and 3, an effect brought about by the substrate-type optical waveguide 1.

FIG. 2 is a plan view of a substrate-type optical waveguide 1 used to verify the effect. To verify the effect, a substrate-type optical waveguide 1 was used which employed a configuration in which a traveling-wave electrode 15a and an earth conductor 15b were provided so that a distance D therebetween decreases in stages as a distance from the entrance end 15a1 increases (see (a) and (b) of FIG. 2). More specifically, out of the substrate-type optical waveguides 1 employing the configuration, (i) a substrate-type optical waveguide 1 configured such that a distance D changes in a two-stage manner (see (a) of FIG. 2) and (ii) a substrate-type optical waveguide 1 configured such that a distance D changes in a four-stage manner (see (b) of FIG. 2) were employed.

(a) of FIG. 3 is a graph showing frequency dependencies of reflection coefficients S11 of the respective substrate-type optical waveguides 1 illustrated in (a) and (b) of FIG. 2. (b) of FIG. 3 is a graph showing frequency dependencies of transmission coefficients S12 of the respective substrate-type optical waveguides 1 illustrated in (a) and (b) of FIG. 2. Note that (a) of FIG. 3 also shows a frequency dependency of a reflection coefficient S11 of a substrate-type optical waveguide in accordance with a comparative example in which a distance D is uniform (i.e., the number of stages is one (1)). (b) of FIG. 3 also shows a frequency dependency of a transmission coefficient S12 of the substrate-type optical waveguide in accordance with the comparative example in which the distance D is uniform (i.e., the number of stages is one (1)).

(a) of FIG. 3 demonstrates that the reflection coefficient S11 can be reduced, by employing a configuration in which the distance D decreases in stages as a distance from the entrance end 15a1 increases (i.e., configurations which are illustrated in respective of (a) and (b) of FIG. 2 and which correspond to respective of Stage=2 and Stage=4 in (a) of FIG. 3), as compared with a case where a configuration is employed in which the distance D is uniform (i.e., a configuration which is not illustrated in FIG. 2 and which corresponds to Stage=1 in (a) of FIG. 3). According to a comparison between the two substrate-type optical waveguides 1, each of which employs a configuration in which the distance D decreases in stages as a distance from the entrance end 15a1 increases, the reflection coefficient S11 decreases as the number of stages increases (see (a) of FIG. 3).

Meanwhile, (b) of FIG. 3 demonstrates that the transmission coefficient S21 can be increased by employing a configuration in which the distance D decreases in stages as a distance from the entrance end 15a1 increases (i.e., the configurations which are illustrated in respective of (a) and (b) of FIG. 2 and which correspond to respective of Stage=2 and Stage=4 in (a) of FIG. 3), as compared with a case where a configuration is employed in which the distance D is uniform (i.e., the configuration which is not illustrated in FIG. 2 and which corresponds to Stage=1 in (a) of FIG. 3). According to a comparison between the two substrate-type optical waveguides 1, each of which employs a configuration in which the distance D decreases in stages as a distance from the entrance end 15a1 increases, the transmission coefficient S21 increases as the number of stages increases (i.e., as the configuration becomes similar to a configuration in which the distance D continuously increases) (see (b) of FIG. 3).

[Variations]

The present embodiment has discussed the substrate-type optical waveguide 1 configured so that the traveling-wave electrode 15a, having a uniform width, is sandwiched between the pair of earth conductors 15b and 15c which are provided so that a distance therebetween gradually decreases as a distance from the entrance end 15a1 of the traveling-wave electrode 15a increases (see the plan view of (a) of FIG. 1). The present invention is, however, not limited to such a configuration.

Figure 4:
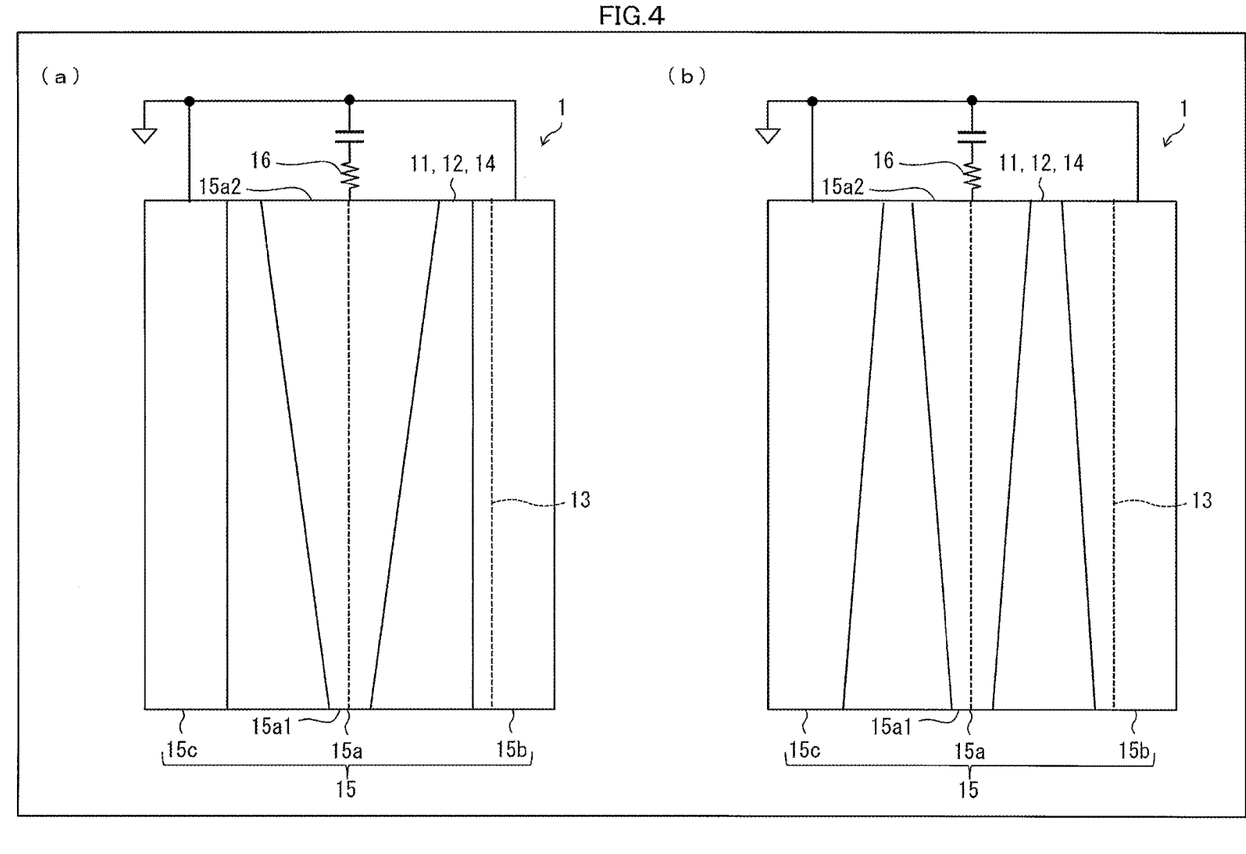

The configuration illustrated in the plan view of (a) of FIG. 1 can be replaced by, for example, a configuration in which a traveling-wave electrode 15a, whose width gradually increases as a distance from an entrance end 15a1 increases, is sandwiched between a pair of earth conductors 15b and 15c provided at a uniform distance (see the plan view of (a) of FIG. 4). Alternatively, the configuration illustrated in the plan view of (a) of FIG. 1 can be replaced by, for example, a configuration in which a traveling-wave electrode 15a, whose width gradually increases as a distance from an entrance end 15a1 increases, is sandwiched between a pair of earth conductors 15b and 15c provided at a distance which decreases as a distance from the entrance end 15a1 of the traveling-wave electrode 15a increases (see the plan view of (b) of FIG. 4).

Both of the configurations can bring about an effect similar to that brought about by the configuration illustrated in the plan view of (a) of FIG. 1. This is because the traveling-wave electrode 15a and the earth conductor 15b are provided so that the distance D therebetween decreases as a distance from the entrance end 15a1 of the traveling-wave electrode 15a increases.

[Application Example]

Figure 5:
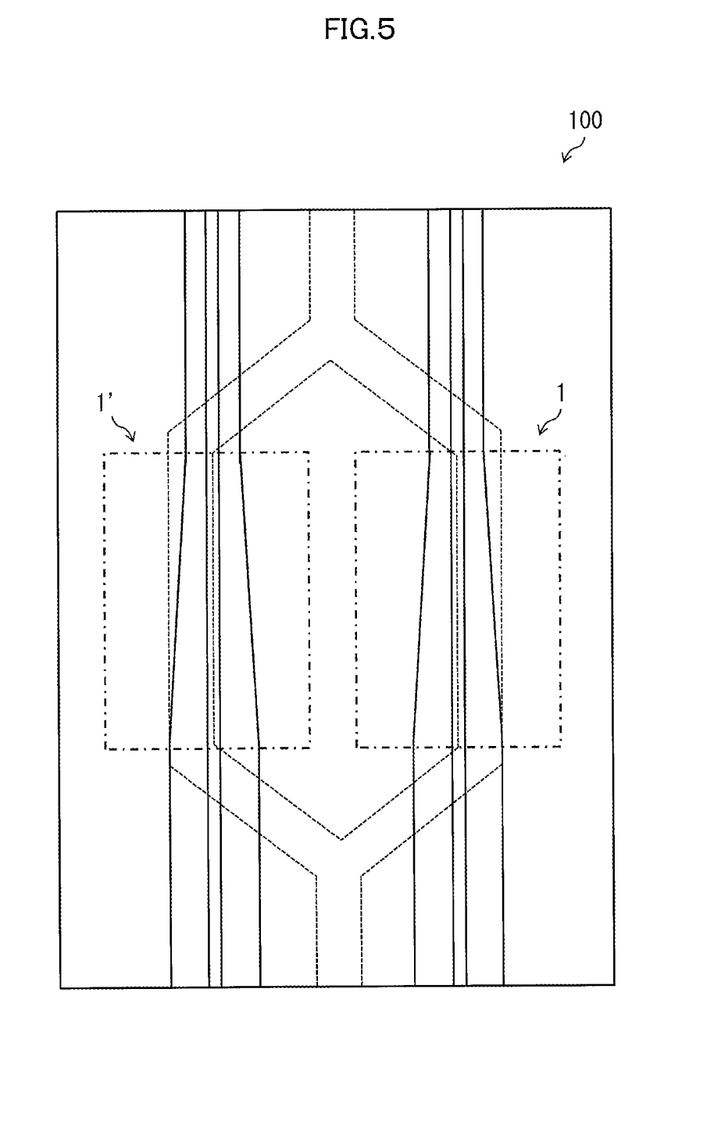
FIG. 5 is a plan view of a substrate-type optical modulator which includes, as a phase modulating section, the substrate-type optical waveguide illustrated in FIG. 1.

The following description will discuss, with reference to FIG. 5, a substrate-type optical modulator 100 which includes the substrate-type optical waveguide 1 as a phase modulating section. FIG. 5 is a plan view of the substrate-type optical modulator 100. The substrate-type optical modulator 100 is a Mach-Zehnder optical modulator in which beams of light, which are subjected to phase modulation by use of two optical paths, are caused to interfere with each other so that light, which is subjected to intensity modulation, is obtained. The substrate-type optical modulator 100 includes the substrate-type optical waveguide 1 as a phase modulating section which subjects one of beams of branched carrier light to phase modulation. A phase modulating section, by which the other of the beams of the branched carrier light is subjected to phase modulation, is constituted by a substrate-type optical waveguide 1' which has a structure symmetrical to that of the substrate-type optical waveguide 1.

[Main Points]

A substrate-type optical waveguide in accordance with an aspect of the present invention includes: a lower cladding; a core, provided on an upper surface of the lower cladding, which has a P-type semiconductor region and an N-type semiconductor region; an upper cladding which is laminated on the lower cladding so that the core is buried in the upper cladding; and a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region, the traveling-wave electrode and the earth conductor being provided so that a distance therebetween decreases as a distance from an entrance end of the traveling-wave electrode increases.

The configuration makes it possible to reduce a distance, at each cross section other than an entrance end surface, between the traveling-wave electrode and the earth conductor while maintaining a distance, at the entrance end surface, between the traveling-wave electrode and the earth conductor. It is therefore possible to reduce an inductance of the substrate-type optical waveguide while maintaining a characteristic impedance of the substrate-type optical waveguide. Consequently, it is possible to reduce a high frequency loss while restraining the reflection by the entrance end of the traveling-wave electrode.

The substrate-type optical waveguide in accordance with an aspect of the present invention can employ a configuration in which the distance continuously decreases as the distance from the entrance end surface increases. Alternatively, the substrate-type optical waveguide can employ a configuration in which the distance decreases in stages as the distance from the entrance end surface increases.

Both of the configurations make it possible to reduce the high frequency loss while restraining a reflection by the entrance end of the traveling-wave electrode.

A substrate-type optical waveguide in accordance with an aspect of the present invention is preferably configured such that a terminal resistor is connected to an exit end of the traveling-wave electrode; and a resistance of the terminal resistor matches a characteristic impedance of the substrate-type optical waveguide.

The above configuration makes it possible to (i) restrain, in both of a low frequency domain and a high frequency domain, a reflection by an entrance end of the traveling-wave electrode and (ii) restrain, in the low frequency domain, a reflection by an exit end of the traveling-wave electrode. Note that the reflection, in the high frequency domain, by the exit end of the traveling-wave electrode is subjected to a significant attenuation while propagating through the traveling-wave electrode in an opposite direction. Such a reflection therefore does not adversely affect a circuit which is followed by the substrate-type optical waveguide.

A substrate-type optical waveguide in accordance with an aspect of the present invention is preferably configured such that the core is of a rib-slab type; and a boundary surface between the P-type semiconductor region and the N-type semiconductor region is located within a rib of the core.

According to the above configuration, a depletion layer is provided within the rib where light which is propagating through the core is unevenly distributed. This makes it possible to efficiently modulate light which propagates through the core.

[Supplemental Note]

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Substrate-type optical waveguide
11: Silicon substrate
12: Lower cladding
13: Core
14: Upper cladding
15: Coplanar line
15a: Traveling-wave electrode
15a1: Entrance end
15a2: Exit end
15b: Earth conductor
16: Terminal resistor
100: Substrate-type optical modulator

The invention claimed is:

1. A substrate-type optical waveguide, comprising:
a lower cladding;
a core, provided on an upper surface of the lower cladding, which has a P-type semiconductor region and an N-type semiconductor region;
an upper cladding which is laminated on the lower cladding so that the core is buried in the upper cladding; and
a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region,
the traveling-wave electrode and the earth conductor being provided so that a distance therebetween decreases as a distance from an entrance end of the traveling-wave electrode increases, across an entire region which is present, relative to a portion at which (i) one of the P-type semiconductor region and the N-type semiconductor region and (ii) the traveling-wave electrode are connected to each other, in a direction orthogonal to a direction in which light propagating through the core travels.

2. The substrate-type optical waveguide as set forth in claim 1, wherein:
the distance continuously decreases as the distance from the entrance end of the traveling-wave electrode increases.

3. The substrate-type optical waveguide as set forth in claim 1, wherein:
the distance decreases in stages as the distance from the entrance end of the traveling-wave electrode increases.

4. The substrate-type optical waveguide as set forth in claim 1, wherein:
a terminal resistor is connected to an exit end of the traveling-wave electrode; and
a resistance of the terminal resistor matches a characteristic impedance of the substrate-type optical waveguide.

5. The substrate-type optical waveguide as set forth in claim 1, wherein:
the core is of a rib-slab type; and
a boundary surface between the P-type semiconductor region and the N-type semiconductor region is located within a rib of the core.

6. A substrate-type optical modulator employing, as a phase modulating section, a substrate-type optical waveguide recited in claim 1.

* * * * *